(12) United States Patent
Schnell et al.

(10) Patent No.: US 9,273,780 B2
(45) Date of Patent: Mar. 1, 2016

(54) SLIDING BLOCK FOR A PISTON OF A HYDRAULIC PISTON MACHINE

(75) Inventors: Matthias Schnell, Rottenburg (DE); Alexander Nestler, Tuebingen (DE); Tobias Korte, Nersingen (DE)

(73) Assignee: Robert Bosch GmbH, Stuttgart (DE)

( * ) Notice: Subject to any disclaimer, the term of this patent is extended or adjusted under 35 U.S.C. 154(b) by 460 days.

(21) Appl. No.: 13/559,316

(22) Filed: Jul. 26, 2012

(65) Prior Publication Data

US 2013/0186267 A1    Jul. 25, 2013

(30) Foreign Application Priority Data

Jul. 29, 2011 (DE) .......................... 10 2011 108 960

(51) Int. Cl.
*F16J 1/09* (2006.01)
*F04B 1/12* (2006.01)

(52) U.S. Cl.
CPC . *F16J 1/09* (2013.01); *F04B 1/124* (2013.01); *F04B 1/126* (2013.01)

(58) Field of Classification Search
CPC .................................................. F04B 27/0821
USPC .................... 92/72, 57, 12.2, 158, 159, 153
See application file for complete search history.

(56) References Cited

U.S. PATENT DOCUMENTS

| 5,601,009 A * | 2/1997 | Jepsen et al. ....................... 92/71 |
| 6,555,777 B1 | 4/2003 | Stoppek |
| 2008/0223207 A1* | 9/2008 | Olsen et al. ....................... 92/71 |

FOREIGN PATENT DOCUMENTS

DE    32 10 146 A1    11/1982
EP    0 763 657 A1    3/1997

OTHER PUBLICATIONS

Machine Translation of EP076357 retrieved from Espacenet (http://worldwide.espacenet.com/publicationDetails/biblio?DB=worldwide.espacenet.com&ll=0&ND=3&adjacent=true&locale=en_EP&FT=D&date=19970319&CC=EP&NR=0763657A1&KC=A1) on Oct. 7, 2014.*
Designing to Minimize Stress Concentration, 255, 265.*

* cited by examiner

*Primary Examiner* — Nathaniel Wiehe
*Assistant Examiner* — Dustin T Nguyen
(74) *Attorney, Agent, or Firm* — Maginot, Moore & Beck LLP

(57) ABSTRACT

A sliding block for a piston of a hydraulic piston machine, includes a concave recess to receive a piston head and a sliding surface to support the piston. A lubricant channel passes through the sliding block from the concave recess to the sliding surface, and the concave recess transforms with a constant tangent i.e. without kinking into a transition segment of a constantly narrowing taper segment of the lubricant channel. The transition segment is convex.

7 Claims, 5 Drawing Sheets

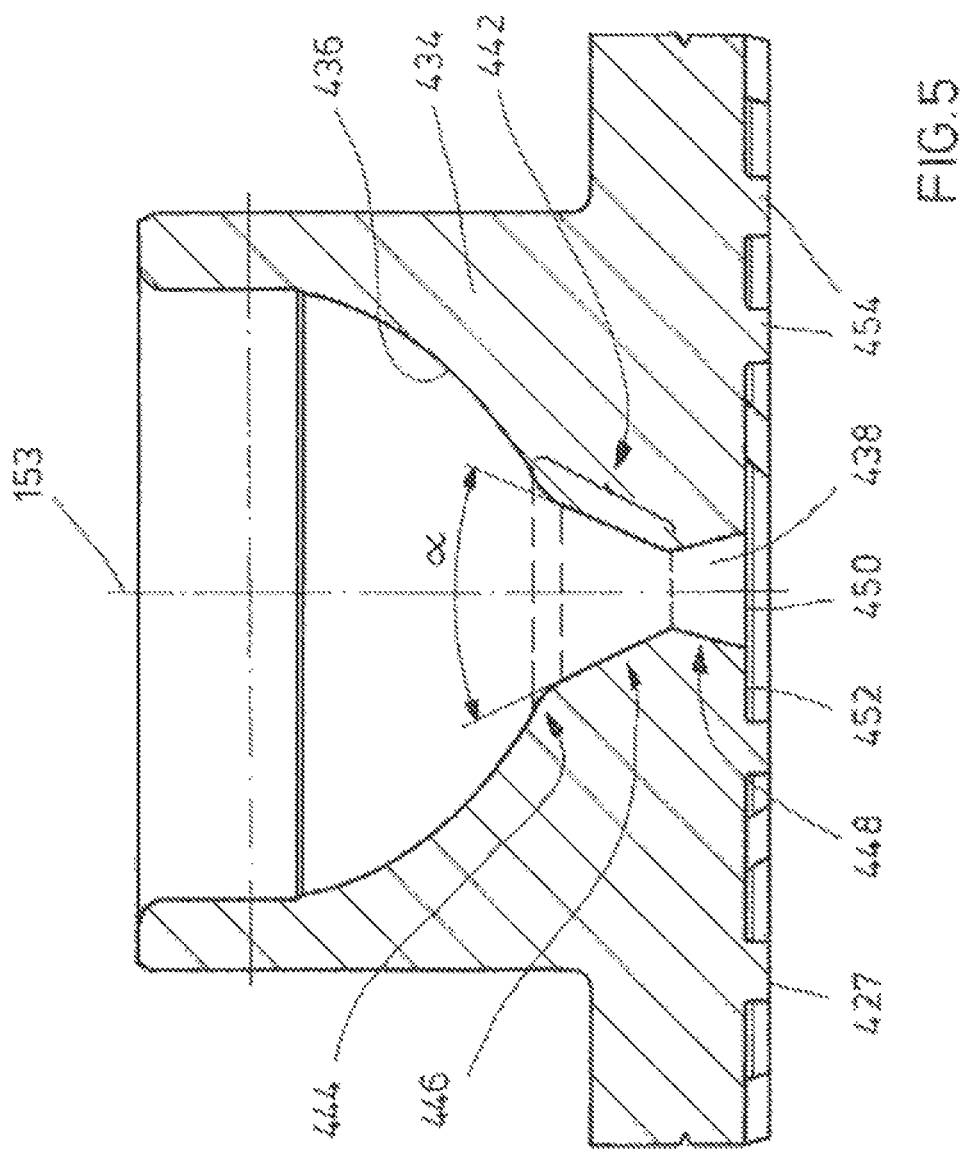

SLIDING BLOCK FOR A PISTON OF A HYDRAULIC PISTON MACHINE

This application claims priority under 35 U.S.C. §119 to patent application no. DE 10 2011 108 960.1, filed on Jul. 29, 2011 in Germany, the disclosure of which is incorporated herein by reference in its entirety.

The present disclosure relates to a sliding block for a piston of a hydraulic piston machine, as described herein.

BACKGROUND

A hydraulic piston machine has cylinder-piston units each with a piston or working piston displaceable axially in a cylinder. The piston is held with a piston head in a concave recess of a sliding block which is preferably made of nonferrous metal or steel. Via the sliding block the piston can be supported on a sliding surface or a swash plate of the piston machine. During operation of the piston machine, the sliding block must tolerate piston support forces which are substantial depending on the working pressure of the piston machine or the viscosity of the hydraulic fluid. Under this mechanical load, firstly wear can occur because of the sliding friction and secondly breakage of the sliding block.

To reduce this risk, the sliding surface of the sliding block is lubricated. This is achieved by means of a lubricant channel which passes through the sliding block from its concave recess to its sliding surface and via which lubricant or hydraulic fluid is delivered to the sliding surface. It is also known that the lubricant channel opens into a relief recess of the sliding surface of the sliding block, improving lubrication and relieving the load on the sliding block.

For this, U.S. Pat. No. 6,555,777 B1 discloses two embodiment examples of a sliding block with a lubricant channel arranged centrally. The lubricant channel of the first embodiment example opens via a small concave spherical cap with a sharp edge into the concave recess and with a long thin bore into a relief recess of the sliding surface. The lubricant channel of the second embodiment example opens via a broad cylindrical bore also with a sharp edge into the concave recess and with a frustoconical expansion into the sliding surface.

A sliding block shown in DE 3210146 A1 has a central lubricant channel which transforms via a broad cylindrical bore with a sharp edge into the concave recess. Adjacent to the cylindrical bore in the direction of the sliding surface is a frustoconical expansion which transforms into a narrow cylindrical bore which in turn opens into a relief recess of the sliding block. The transitions between the cylindrical bores and the frustoconical expansion are in this case sharp-edged.

The disadvantage of the solutions of both publications is that at the sharp-edged transitions of the lubricant channel, the sliding block is exposed to a high stress concentration which reduces the strength.

Publication EP 0763657 A1 shows a sliding block with reduced stress concentration at the lubricant channel. This has no sharp edges at the transition into the concave recess or into the relief recess. The concave recess transforms with a constant tangent, i.e. without kinking, into a frustoconically narrowing segment of the lubricant channel, which in turn transforms via a rounding into a cylindrical segment of the lubricant channel, which finally opens into the relief recess.

The disadvantage of this sliding block is that the large frustoconical segment can no longer serve as a support surface for the piston head, so that a substantial proportion of the support force to be absorbed by the sliding block is unfavorably transferred radially into the sliding block, which can lead to a fission of the sliding block.

In view of this, the object of the disclosure is to create a sliding block with increased strength.

SUMMARY

A sliding block according to the disclosure for a piston of a hydraulic piston machine has a concave recess to receive a piston head, and a sliding surface to support the piston, in particular at a sliding or swash plate of the piston machine. Furthermore a lubricant channel passes through the sliding block from the concave recess to the sliding surface. The concave recess transforms with a constant tangent or without kinking into a transition segment of a constantly narrowing taper segment of the lubricant channel. According to the disclosure the transition segment is convex or formed with a curvature greater than zero.

In comparison with the prior art, the convex transition segment with constant tangent according to the disclosure reduces a stress concentration at the transition of the concave recess to the lubricant channel. Experiments have shown that such a geometry allows the transfer of higher piston support forces into the sliding block. A strength of the sliding block, in particular against a fission of the sliding block starting from the lubricant channel, is thereby increased. With the geometry of the lubricant channel according to the disclosure, lower-quality semi-finished products can therefore be used on manufacture of the sliding block with no loss of strength. In particular costly forged blanks can be omitted to the benefit of more favorable bars. Also the geometry of the lubricant channel according to the disclosure has proved economically favorable in production as the number of machining surfaces is minimized The constantly narrowing taper segment has no kinks or edges in the direction of the sliding surface, in order to minimize the stress concentration in this region too. The piston can be a working piston or an actuator piston of the hydraulic piston machine.

In a preferred refinement of the sliding block, a curvature of a casing curve or casing line of the taper segment is everywhere greater than zero or convex or equal to zero. Thus the lubricant channel along the taper segment has no portion which is formed concave. The casing curve corresponds substantially to an intersection curve of the taper segment which runs from the concave recess along the taper segment in the direction of the sliding surface.

In a particularly advantageous refinement of the sliding block which is simple to produce in relation to manufacturing technology, the curvature of the casing curve is constant along the transition segment. The transition segment thus has a constant radius in the direction toward the sliding surface. As an alternative which is however more complex to produce in terms of manufacturing technology, the curvature is variable along the transition segment.

In an advantageous refinement the convex transition segment transforms into a connecting segment of the constantly narrowing taper segment. Along the connecting segment the curvature of the casing curve is preferably less than along the transition segment.

Particularly preferably the casing curve along the connecting segment comprises a line or an ellipsoid arc segment or a circular arc segment. Via the line, the connecting segment is formed frustoconical at least in portions and thus comparatively simple to produce.

In a preferred refinement of the sliding block, the taper segment of the lubricant channel transforms into a cylindrical, in particular circular cylindrical, relief segment of the lubricant channel.

In a preferred and alternative refinement of the sliding block, the taper segment transforms into a relief segment of the lubricant channel which expands constantly, in particular frustoconically, in the direction of the sliding surface.

Alternatively or additionally, the relief segment of the lubricant channel can have both a cylindrical, in particular circular cylindrical, and a constantly expanding, in particular frustoconical, segment.

To deliver the lubricant or hydraulic fluid from the concave recess to the sliding surface and effectively relieve the load on the sliding block lying against a sliding surface, the sliding surface has a relief recess in which is arranged a mouth of the lubricant channel, in particular of the relief segment. Alternatively the mouth is arranged in the sliding surface itself.

To minimize a stress concentration at a mouth of the lubricant channel into the sliding surface or relief recess, this mouth has a rounding or chamfer.

The sliding block according to the disclosure is particularly simple to produce if the lubricant channel is rotationally symmetrical.

BRIEF DESCRIPTION OF THE DRAWINGS

As an overview, a use of a sliding block according to the disclosure in a hydraulic piston machine is explained below with reference to one diagrammatic drawing. Furthermore, four embodiment examples of a sliding block according to the disclosure are explained in more detail with reference to four diagrammatic drawings. These show:

FIG. 5 a fourth embodiment example of a sliding block in a side section.

DETAILED DESCRIPTION

Figure 1:
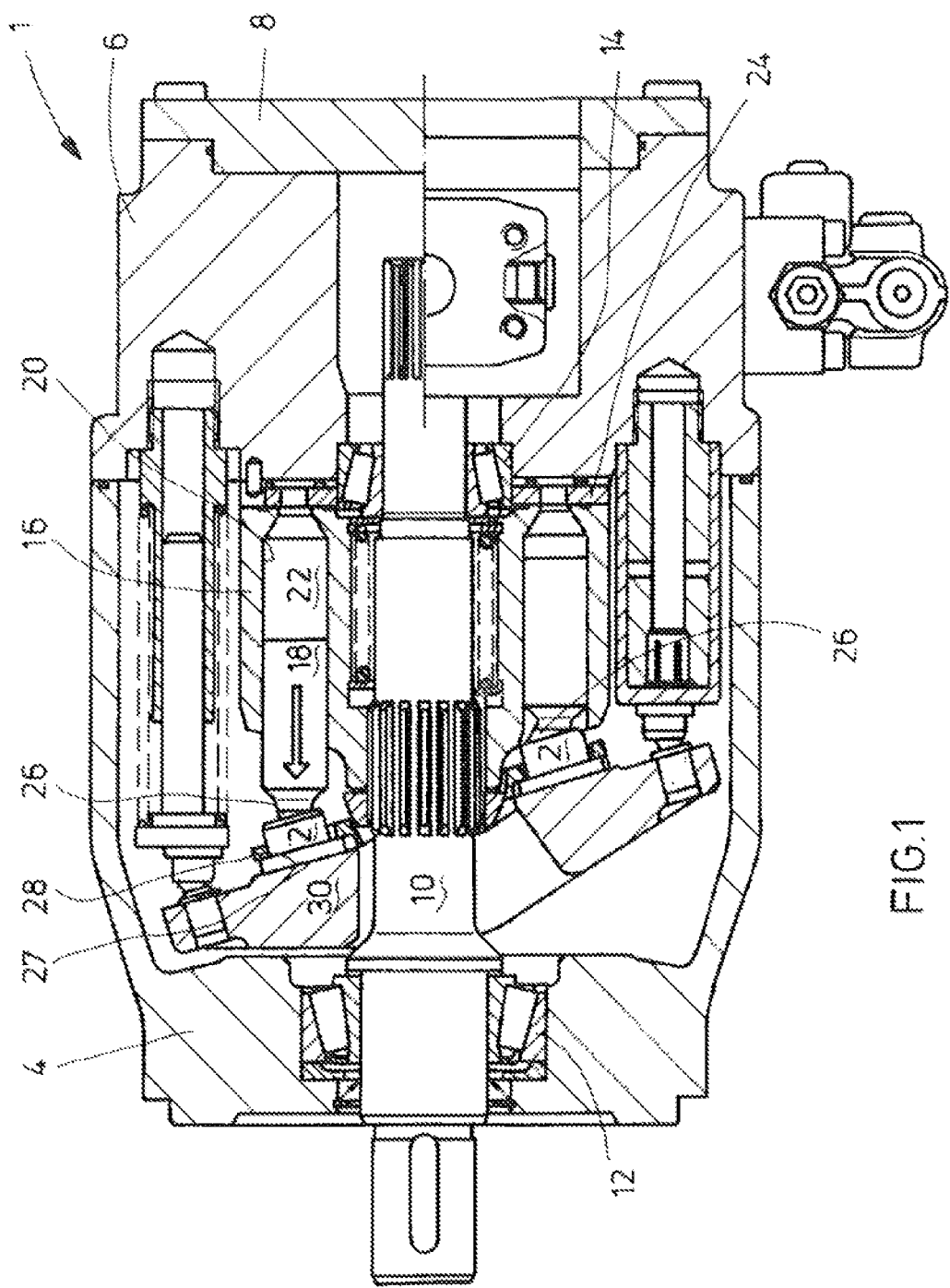
FIG. 1 to illustrate a use of a sliding block, a hydraulic piston machine in a diagrammatic side section.

To illustrate a use of a sliding block 2 according to the disclosure, FIG. 1 shows a hydraulic piston machine 1 in a diagrammatic side section. The description of FIG. 1 is here restricted to the parts of the hydraulic piston machine relevant to understanding the disclosure. For a more detailed description of a hydraulic piston machine, reference is made to the relevant prior art.

The hydraulic piston machine 1 is designed as an adjustable axial piston pump in a swash plate construction. It has a housing with a pot-like housing base 4 on which is placed a housing part 6. The housing is closed by a housing cover 8 on the right in FIG. 1. Passing through the housing base 4 on the left in FIG. 1 is a drive shaft 10 which is mounted in the housing base 4 and in the housing part 6 via roller bearings 12, 14. A cylinder drum 16 is connected rotationally fixed with the drive shaft 10, in which drum a multiplicity of pistons 18 is guided axially displaceably. The pistons each with a cylinder bore 20 delimit a working chamber 22. A supply of hydraulic fluid to and extraction of hydraulic fluid from the working chamber 22 during rotation of the drive shaft 10 are controlled by a control plate 24 fixed to the housing.

Piston feet 26 protruding from the cylinder drum 16 are supported via a sliding surface 27 of the sliding block 2 on a sliding surface 28 of a swash plate 30. On a compression stroke of the piston 18, the sliding block 2 must absorb an axial force, indicated in FIG. 1 by an arrow, and transfer this to the swash plate. In particular depending on the operating pressure of the hydraulic piston machine 1 or the hydraulic axial piston pump and the viscosity of the hydraulic fluid, the stresses resulting at the sliding block 2 can lead to its breakage or fission.

Since, to improve its sliding performance on a swash plate, a sliding block usually has a lubricant channel which can be supplied with hydraulic fluid via the working chamber and a bore in the piston, and this lubricant channel is normally a weak point with a stress concentration, a geometry of the sliding block 2 according to the disclosure is improved in the region of the lubricant channel. See FIGS. 2 to 5 below.

Figure 2:
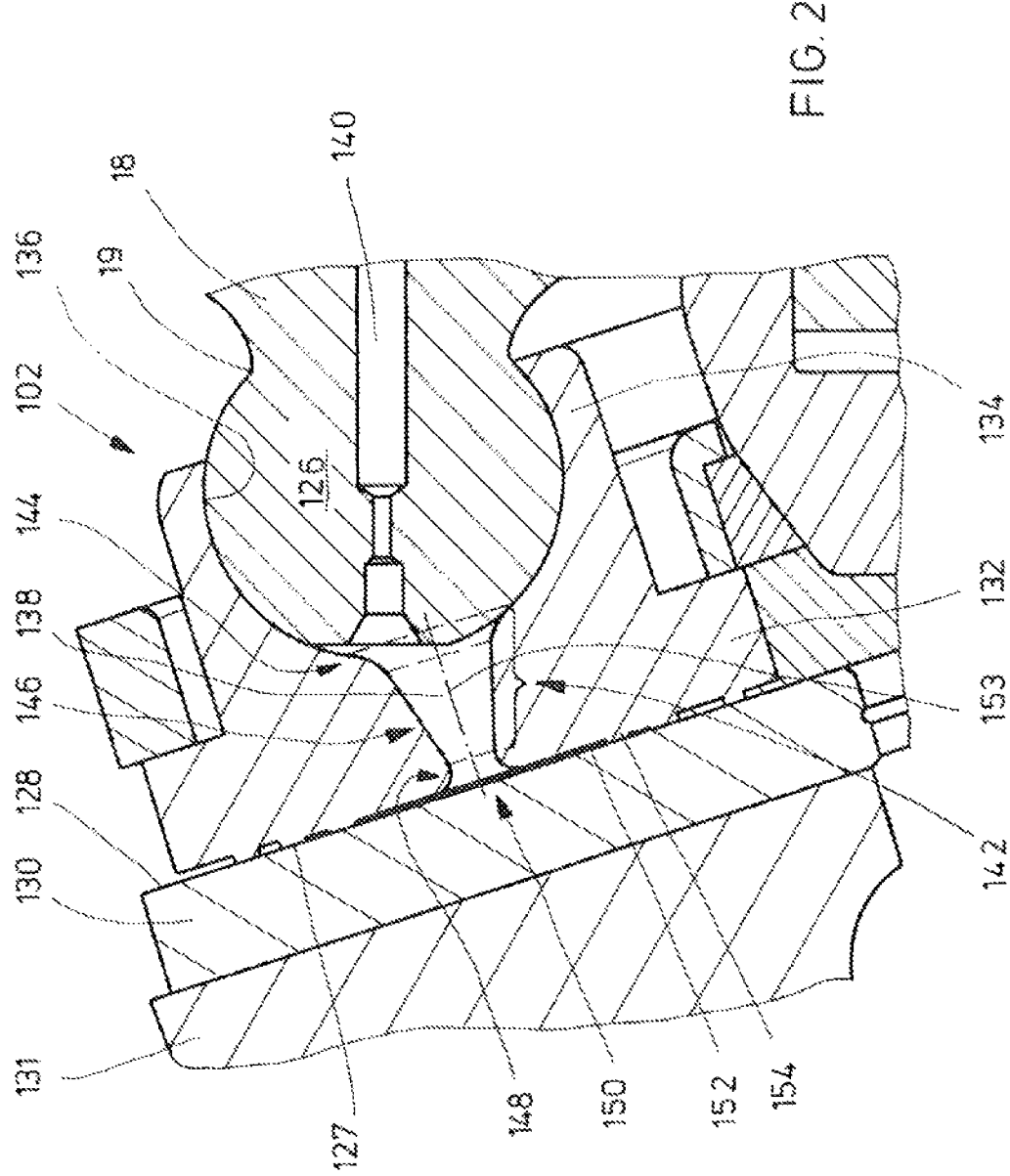
FIG. 2 a first embodiment example of a sliding block with a piston of a hydraulic piston machine in a side part section.

FIG. 2 shows in a side section a first embodiment example of a sliding block 102 with a piston 18 and a swash plate 130 which is arranged at a rocker cradle 131 of a hydraulic piston machine (not shown). The sliding block 102 has a base 132 which is expanded radially in relation to a collar 134 of the sliding block 102. In the collar 134 is formed a cap-like concave recess 136 in which is held a piston head 126. The collar 134 is sealed to absorb tensile forces of the piston 18 in the direction of a neck 19 of the piston 18. A lubricant channel 138 passes through the sliding block 102 from the concave recess 136 to a sliding surface 127. To lubricate the two sliding surfaces 127, 128, hydraulic fluid or lubricant is supplied to these from the working chamber (not shown) via a lubricant bore 140 in the piston 18.

The lubricant channel 138 has a taper segment 142 constantly narrowing from the concave recess 136 in the direction of the sliding surface 127, which segment extends from a dotted line on the right in the figure to a dotted line on the left in the figure, or to the narrowest point of the lubricant channel 138. The concave recess 136 transforms at the right-hand dotted line with a constant tangent, i.e. without kinks or edges, into a transition segment 144 of the taper segment 142 of the lubricant channel 138. The transition segment 144 according to the disclosure is formed convex. A connecting segment 146 of the taper segment 142 adjacent to the transition segment 144 is formed frustoconical.

Adjacent to the taper segment 142 on the left in FIG. 2 is a relief segment 148 which has a mouth 150 open to the sliding surface 127. The mouth 150 is arranged in a relief recess 152 slightly set back axially and rounded in relation to the sliding surface 127. Further relief recesses are separated by webs 154 in the sliding surface 127. The centrally arranged relief recess 152 is formed circular about a central axis 153, the further peripheral relief recesses separated by the webs 154 are formed substantially as circular channels about the center axis 153.

Figure 3:
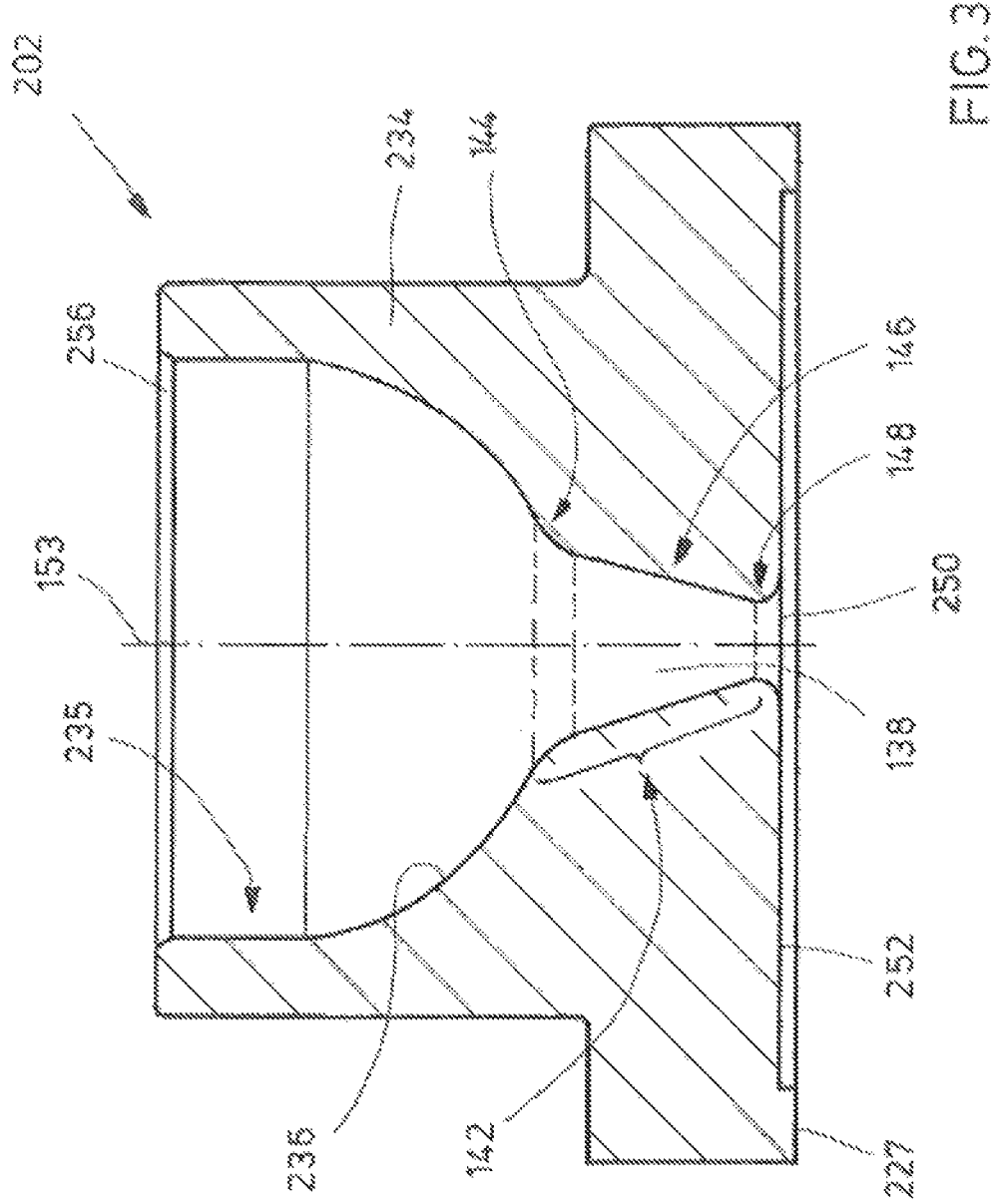
FIG. 3 a second embodiment example of a sliding block in a side section.

FIG. 3 in comparison with the first embodiment example in FIG. 2 shows in a side section a second embodiment example, slightly simpler in terms of the device, of a sliding block 202. By deviation from the first embodiment example, the sliding block 202 has no webs (154 in FIG. 2). In a sliding surface 227 of the sliding block 202 therefore only one large circular cylindrical relief recess 252, rotationally symmetrical to the center axis 153, is formed. Arranged in the relief recess 252 is a mouth 250 of the lubricant channel 138. The lubricant channel 138 extending from the top dotted line in FIG. 3 to a mouth 250, with its transition segment 144 which transforms with a constant tangent into a concave recess 236, the frustoconical connecting segment 146 adjacent thereto with a constant tangent, and the relief segment 148 which is rounded in relation to the mouth 250, corresponds to the lubricant channel 138 of the first embodiment example in FIG. 2.

A collar 234 of the sliding block 202 is shown in its unsealed state. Adjacent to the cap-like concave recess 236 is a circular cylindrical collar segment 235 radially expanded in relation to the concave recess 236. A peripheral inner edge 256 of the collar segment 235 is rounded in order not to damage a piston head held in the concave recess 236 in the sealed state of the collar 234 and to guarantee mobility of the piston head in the sliding block 202.

Figure 4:
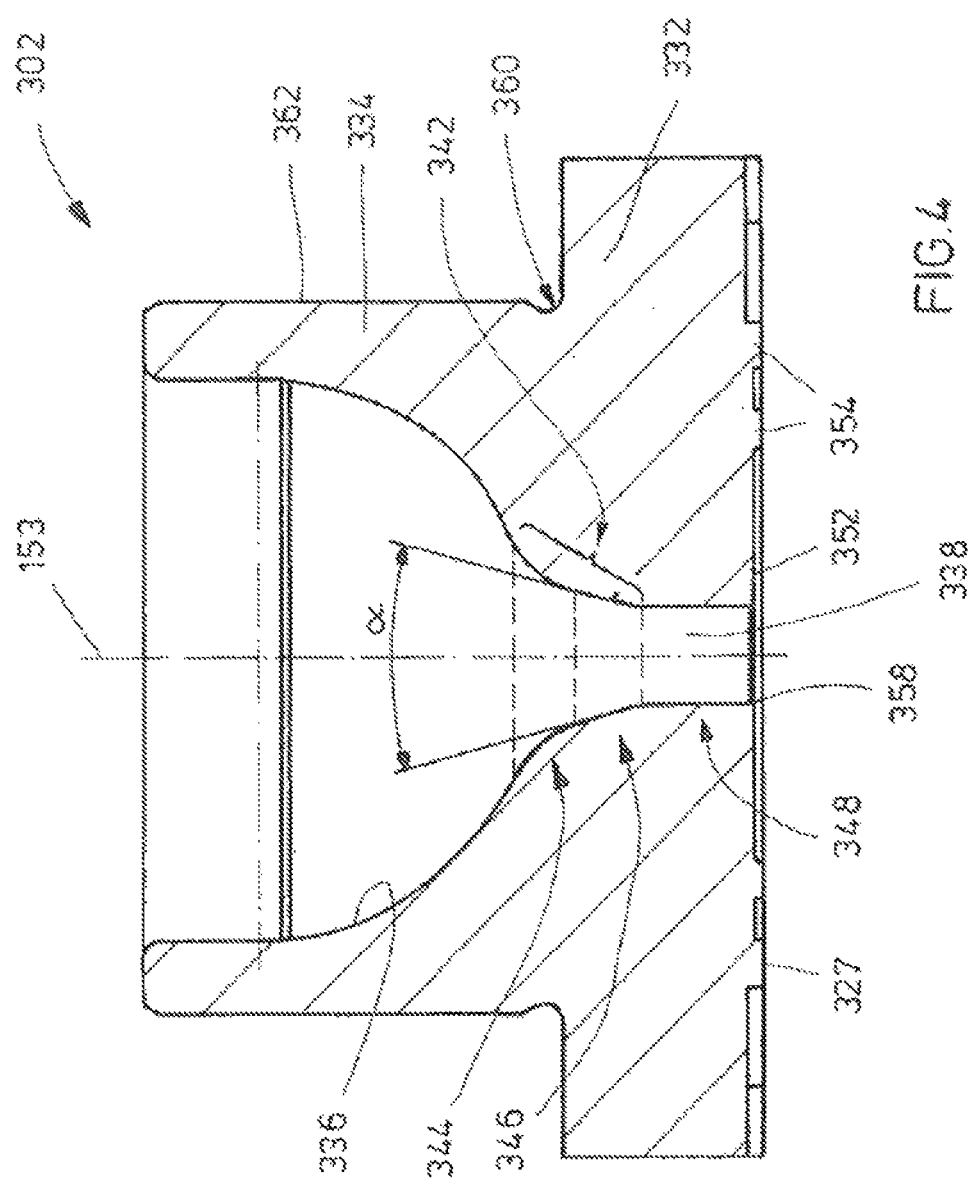
FIG. 4 a third embodiment example of a sliding block in a side section.

FIG. 4 shows a third embodiment example of a sliding block 302 in a side section. To avoid expanding the description unnecessarily, this concentrates on features which deviate from the first two embodiment examples (see FIGS. 2 and 3).Features of the third embodiment which are not addressed in the following description, but which are similar to features of the second embodiments, are designated by like reference numerals incremented by 100.

By deviation from the sliding blocks of the first two embodiment examples according to FIGS. 2 and 3, the sliding block 302 has a lubricant channel 338 with a transition segment 344 which has a comparatively slight convex curvature. Adjacent thereto is a short frustoconical connecting segment 346 with a constant tangent. With a small transition radius this in turn transforms into a relatively long circular cylindrical relief segment 348. The connecting segment 346 in relation to the first two embodiment examples has a relatively acute taper angle α of around 30°. The transitions between segments 344, 346 and 348—as in the earlier embodiment examples—are produced with a constant tangent or without kink. The relief segment 348 transforms into a relief recess 352 with a chamfer 358.

To reduce a stress concentration at a transition 360 from a collar 334 to a base 332 of the sliding block 302, the transition 360 is set back radially in relation to an outer surface 362 of the collar 334.

FIG. 5 shows a fourth embodiment example of a sliding block 402 in a side section. The description is also concentrated here on features deviating from the first three embodiment examples (see FIGS. 2, 3 and 4).Features of the fourth embodiment which are not addressed in the following description, but which are similar to features of the second and third embodiments, are designated by like reference numerals incremented by 200 and 100, respectively.

The sliding block 402 has a lubricant channel 438 with a convex transition segment 444 which is adjacent to a frustoconical connecting section 446 with a constant tangent or kink-free. By deviation from the sliding blocks of the first three embodiment examples according to FIGS. 2 to 4, the connecting segment 446 is adjacent to a frustoconically expanding relief segment 448. As a transition from connecting segment 446 to relief segment 448 is not rounded, the stress concentration is increased at this point but production simplified. The connecting segment 446 in relation to the embodiment example in FIG. 4 has a relatively obtuse tapering angle α of around 50°. The transition between segments 444 and 446, as in the previous embodiment examples, is achieved with a constant tangent or kink-free. The relief segment 448 transforms unrounded into a relief recess 452.

By deviation from the embodiment examples shown with rotationally symmetrical lubricant channels with circular cross sections, a lubricant channel can be stretched or distorted in the radial direction so that the lubricant channel has an oval cross section for example. Angular cross sections are also possible.

By deviation from the embodiment examples shown, a casing curve of the lubricant channel, in particular of the taper segment, can have circular arc segments and/or ellipsoid arc segments transforming into each other.

A connecting channel passes through each web 154; 354; 454 of the embodiment examples shown radially to the center axis 153 of the lubricant channel 138; 338; 438, so that hydraulic fluid can flow radially outwards from the relief recess 152; 252; 352; 452 between the respective sliding surface 127; 227; 327; 427 of the sliding block 102; 202; 302; 402 and a sliding surface on which the sliding block 102; 202; 302; 402 can be supported.

The constantly narrowing taper segment 142; 242; 342; 442 can by deviation from the embodiment examples shown also have one or more cylindrical segments. From a mathematical perspective, the narrowing along the taper segment 142; 242; 342; 442 is in this case also constant as long as an inner casing surface of the taper segment has a constant tangent or is kink-free along this segment.

A transition from a taper segment to a relief segment of a lubricant channel is preferably rounded to reduce the stress concentration.

The sliding block according to the disclosure is preferably made of nonferrous metal or steel.

A sliding block is disclosed for a piston of a hydraulic piston machine with a concave recess to receive a piston head and with a sliding surface to support the piston. A lubricant channel passes through the sliding block from the concave recess to the sliding surface, and the concave recess transforms with a constant tangent i.e. without kinking into a transition segment of a constantly narrowing taper segment of the lubricant channel. According to the disclosure, the transition segment is convex.

What is claimed is:

1. A sliding block for a piston of a hydraulic piston machine, comprising:
    a concave recess structure to receive and directly contact portions of a piston head;
    a sliding surface to support the piston; and
    a lubricant channel structure which passes through the sliding block from the concave recess structure to the sliding surface,
    wherein the sliding block has a one-piece configuration and defines the concave recess structure, the sliding surface, and the lubricant channel structure as integrally formed features thereon,
    wherein the lubricant channel structure includes a continuously narrowing taper segment with a transition segment having a convex curvature,
    wherein the concave recess structure transforms directly into the convex transition segment at a transition point with the convex transition segment and the concave recess structure having an identical tangent at the transition point,
    wherein a curvature of a casing curve of the taper segment is everywhere greater than zero or equal to zero,
    wherein the convex transition segment transforms into a connecting segment of the constantly narrowing taper segment, and
    wherein the casing curve along the connecting segment comprises a line or an elliptical arc segment or a circular arc segment.

2. The sliding block according to claim 1, wherein the curvature of the casing curve is constant along the convex transition segment.

3. The sliding block according to claim 1, wherein the taper segment transforms into a cylindrical relief segment of the lubricant channel structure.

4. The sliding block according to claim 1, wherein the taper segment transforms into a relief segment of the lubricant channel structure which expands constantly in the direction of the sliding surface.

5. The sliding block according to claim 1, wherein the sliding surface has a relief recess in which is arranged a mouth of the lubricant channel structure.

6. The sliding block according to claim 5, wherein the mouth of the lubricant channel structure has a rounding or a chamfer.

7. The sliding block according to claim 1, wherein the lubricant channel structure is rotationally symmetrical.

* * * * *